(12) United States Patent
Guthke et al.

(10) Patent No.: US 8,534,614 B2
(45) Date of Patent: Sep. 17, 2013

(54) DEVICE FOR HOLDING SYSTEMS AND AIRCRAFT OR SPACECRAFT

(75) Inventors: Hans Peter Guthke, Buxtehude (DE); Barbara Lunitz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 7 days.

(21) Appl. No.: 13/205,963

(22) Filed: Aug. 9, 2011

(65) Prior Publication Data
US 2012/0037765 A1  Feb. 16, 2012

Related U.S. Application Data

(60) Provisional application No. 61/372,310, filed on Aug. 10, 2010.

(30) Foreign Application Priority Data

Aug. 10, 2010  (DE) .......................... 10 2010 039 135

(51) Int. Cl.
*F16L 3/08*  (2006.01)

(52) U.S. Cl.
USPC ............. 248/74.1; 248/65; 248/67.5; 248/70; 248/72; 248/74.4

(58) Field of Classification Search
USPC .......................... 248/70, 65, 74.1, 74.4, 67.5
See application file for complete search history.

(56) References Cited

U.S. PATENT DOCUMENTS

| 919,558 | A | | 4/1909 | Doran |
| 2,877,974 | A | | 3/1959 | Estes |
| 3,026,368 | A | * | 3/1962 | Lindsey ........................ 174/169 |
| 3,053,494 | A | | 9/1962 | Stoll |
| 3,437,743 | A | * | 4/1969 | Lindsey ........................ 174/169 |
| 3,836,102 | A | * | 9/1974 | Hall .............................. 248/74.4 |
| 4,079,604 | A | | 3/1978 | Anderegg |
| 4,526,333 | A | * | 7/1985 | Nakama et al. ................. 248/73 |

(Continued)

FOREIGN PATENT DOCUMENTS

| AT | 403 839 B | 8/2008 |
| DE | 902 482 B | 1/1954 |

(Continued)

OTHER PUBLICATIONS

German Office Action for German Application No. 10 2010 039 136.0-24 dated Oct. 15, 2010.

(Continued)

*Primary Examiner* — Amy J Sterling
(74) *Attorney, Agent, or Firm* — Jenkins, Wilson, Taylor & Hunt, P.A.

(57) ABSTRACT

The present invention relates to a device for holding systems, for example an electric or fluid-guiding line, on a structure, in particular an aircraft or spacecraft, comprising: a first holding part, which has a first encompassing portion to encompass the system in portions and a first foot portion; a second holding part, which has a second encompassing portion for encompassing the system in portions and a second foot portion; a fastening mechanism, by means of which the first and second foot portion of the first and second holding part can be detachably fastened to one another, so the first and second encompassing portion of the first and second holding part encompass a region, in which the system is located with its entire periphery.

14 Claims, 4 Drawing Sheets

(56) References Cited

U.S. PATENT DOCUMENTS

| | | | |
|---|---|---|---|
| 4,580,754 A | 4/1986 | Hughes | |
| 5,112,015 A | 5/1992 | Williams | |
| 5,378,171 A * | 1/1995 | Czerlanis | 439/425 |
| RE35,677 E | 12/1997 | O'Neill | |
| 6,161,803 A * | 12/2000 | Daoud | 248/68.1 |
| 6,516,498 B2 * | 2/2003 | LaCoy et al. | 24/16 R |
| 6,994,300 B2 * | 2/2006 | Labeirie et al. | 248/70 |
| 7,238,105 B2 | 7/2007 | Reinders | |
| 8,141,826 B1 * | 3/2012 | Gallardo et al. | 248/74.4 |
| 2008/0296443 A1 | 12/2008 | Lunitz et al. | |
| 2009/0065658 A1 | 3/2009 | Chen et al. | |
| 2011/0006169 A1 * | 1/2011 | Abbott | 248/74.4 |
| 2012/0037418 A1 | 2/2012 | Zyrull et al. | |
| 2012/0037756 A1 | 2/2012 | Guthke et al. | |
| 2012/0037763 A1 | 2/2012 | Guthke et al. | |

FOREIGN PATENT DOCUMENTS

| | | |
|---|---|---|
| DE | 86 20 533 U1 | 11/1986 |
| DE | 297 18 147 U1 | 2/1998 |
| DE | 20 2005 011 492 U1 | 12/2005 |
| DE | 10 2006 015 70 A1 | 11/2006 |
| DE | 10 2007 060 030 A1 | 12/2008 |
| DE | 20 2008 011 723 | 12/2008 |
| EP | 0627587 A1 | 12/1994 |

OTHER PUBLICATIONS

German Office Action for German Application No. 10 2010 039 133.6-24 dated Mar. 22,.

German Office Action for German Application No. 10 2010 039 134.4-24 dated Apr. 1, 2011.

German Office Action for German Application No. 10 2010 039 135.2-24 dated Apr. 1, 2011.

Non-Final Office Action for U.S. Appl. No. 13/193,253 dated Feb. 15, 2013.

* cited by examiner (A)

DEVICE FOR HOLDING SYSTEMS AND AIRCRAFT OR SPACECRAFT

CROSS-REFERENCE TO RELATED APPLICATIONS

This application claims the benefit of and priority to U.S. Provisional Application No. 61/372,310, filed Aug. 10, 2010 and German patent application No. 10 2010 039 135.2, filed Aug. 10, 2010, the entire enclosures of which are herein incorporated by reference.

FIELD OF THE INVENTION

The present invention relates to a device for holding systems and to an aircraft or spacecraft.

Although they can be applied to any systems and aircraft or spacecraft, the present invention and the problem on which it is based will be described in more detail with reference to an electric line in a passenger aircraft.

In a modern passenger aircraft, a large number of electric components have to be connected to one another by means of electric lines. If a spacing between two electric components to be connected exceeds a specific size, it is necessary, in particular for reasons of safety and order, to hold the electric line provided to connect the electric components along its route between the electric components. In this case, the holding generally takes place on a structure, for example on a former or an associated metal sheet, of the passenger aircraft by means of a device.

BACKGROUND OF THE INVENTION

A device of this type is described, for example, in DE 10 2007 060 030 A1. The device described in DE 10 2007 060 030 A1 for holding systems has the drawback that it holds the lines only on a part of its periphery, so the lines can easily detach from the device and fall down. This can lead to failure of the lines.

SUMMARY OF THE INVENTION

It is therefore the object of the present invention, to provide a device and/or an aircraft or spacecraft, which avoids the above-described drawback.

According to the invention, this object is achieved by a device having the features of claim 1 and by an aircraft or a spacecraft having the features of claim 10.

Accordingly, a device is provided for holding systems, for example an electric or fluid-guiding line, on a structure, in particular of an aircraft or spacecraft, comprising: a first holding part, which has a first encompassing portion to encompass the system in portions and a first foot portion; a second holding part, which has a second encompassing portion for encompassing the system in portions and a second foot portion; a fastening mechanism, by means of which the first and second foot portion of the first and second holding part can be detachably fastened to one another, so the first and second encompassing portion of the first and second holding part encompass a region, in which the system is located with its entire periphery.

Furthermore, an aircraft or spacecraft is provided, comprising: a structure, a system; and the device according to the invention, which is fastened to the structure and holds the system relative to the structure.

The idea on which the present invention is based consists in the fact that the device is formed in two parts and that, in the state in which the first and second holding part are fastened to one another, the system is encompassed on its entire periphery by means of the first and second encompassing portion.

This has the advantage that the system is thus securely held and cannot automatically detach from the device. Furthermore, the two-part structure of the device ensures that it can be easily opened in order, for example, to retrospectively tie cables onto bunched cables held by the device or to remove cables from the bunched cables.

Advantageous configurations and improvements to the invention are found in the sub-claims.

According to a preferred development of the device according to the invention, the first and second foot portion, to change the region encompassed by the first and second encompassing portion, can be fastened to one another at different positions to receive the system. As a result, for example, bunched cables of different sizes, in particular with a different diameter, can be held.

According to a further preferred development of the device according to the invention, the fastening mechanism has a latching means, which is formed on the first foot portion of the first holding part, and a counter-latching means, which is formed on the second foot portion of the second holding part, the latching means and the counter-latching means being latchable to one another to fasten the first and second foot portion at the different positions. This produces a simple fastening without additional means, for example screws, of the first holding part on the second holding part.

According to a further preferred development of the device according to the invention, the latching means and/or the counter-latching means has a plurality of teeth, which are arranged one behind the other in the direction along which the first and second foot portion are positioned with respect to one another. In particular, this configuration allows the first and second foot portion to be able to be moved with respect to one another until the first and second encompassing portion rest, at least in portions, against the periphery of the system and the first and second foot portion are held in this position by means of one or more of the plurality of teeth.

According to a further preferred development of the device according to the invention, the first holding part has at least one opening, into which the second holding part can be inserted to fasten the first and second foot portion to one another. As a result, the first and second encompassing portion can easily be moved toward one another and optionally into one another.

According to a further preferred development of the device according to the invention, the opening is provided in the first foot portion and in an end of the first encompassing portion adjoining the first foot portion, the opening being provided with the latching means on the inside and the second foot portion being provided with the counter-latching means on the outside. The latching means are preferably provided on opposing sides of the opening and the counter-latching means are provided on opposing sides of the second foot portion.

According to a further preferred development of the device according to the invention, a detachable blocking element, in particular a cable tie, which extends through an opening in the first and/or second foot portion and blocks a movement of the first and second foot portion with respect to on another, is provided. A securing can thus be provided, which, in addition to the fastening mechanism, prevents a detachment of the first and second foot portion from one another.

More preferably, the first and/or second foot portion has two of the openings. As a result, the cable tie, depending on the position of the first and second foot portion with respect to one another, can be inserted through one or other or through both openings and thus prevent the detachment of the first and second foot portion from one another.

According to a further preferred development of the device according to the invention, the first and/or second encompassing portion is fastened at its one end to the foot portion. More preferably, the first and/or second encompassing portion is approximately semicircular.

According to a further preferred development of the device according to the invention, the first and/or second foot portion has a fastening means for fastening the latter to the structure. For example, fastening means, for example a hole for a screw, may be formed on the first foot portion.

BRIEF DESCRIPTION OF THE DRAWINGS

The invention will be described in more detail below with the aid of embodiments with reference to the accompanying figures of the drawings, in which.

In the figures, like reference numerals refer to like or functionally like components unless otherwise stated.

DETAILED DESCRIPTION OF THE INVENTION

Figure 1:
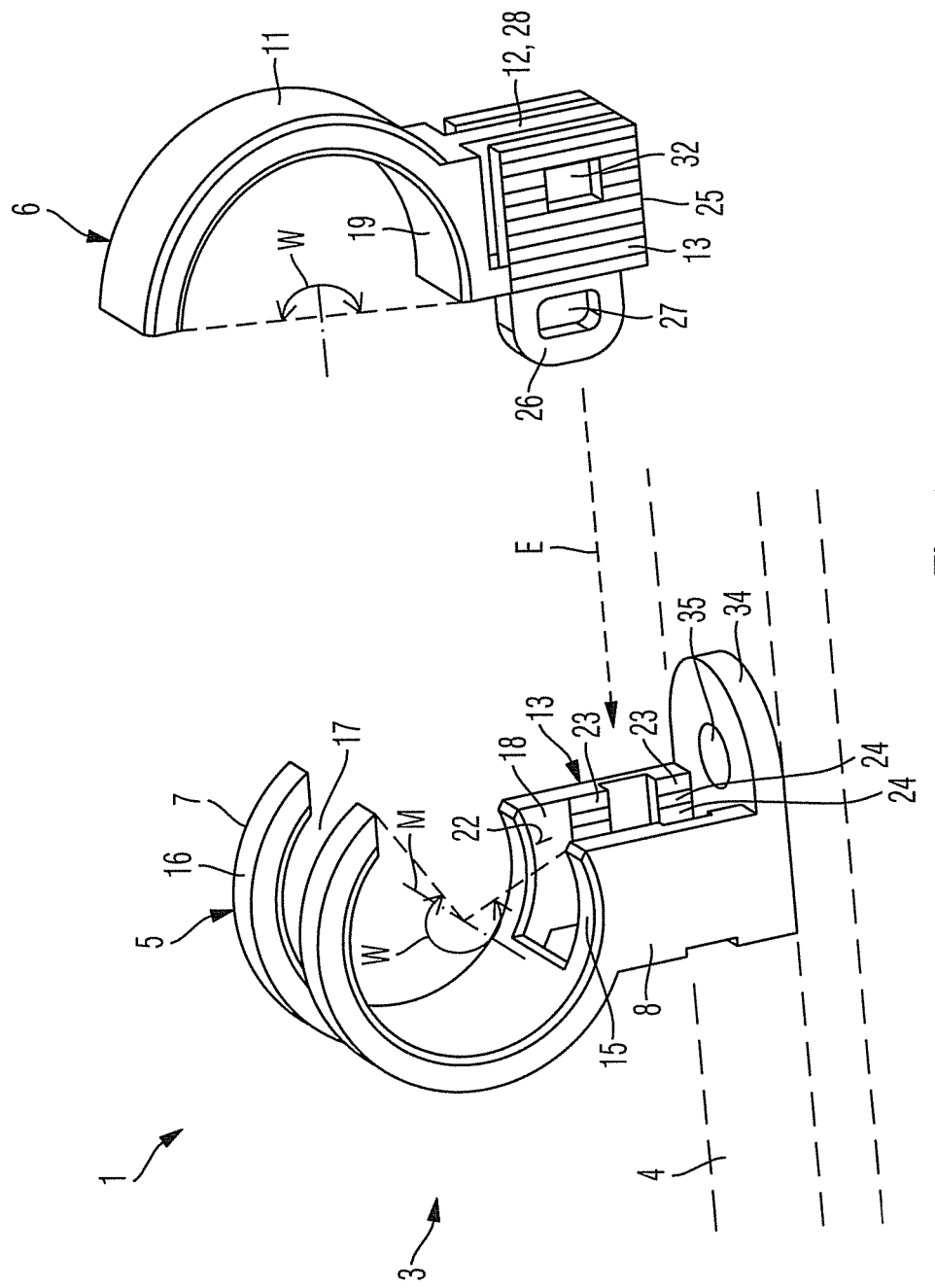
FIG. 1 perspectively shows a device according to an embodiment of the present invention in an opened state.
Figure 2:
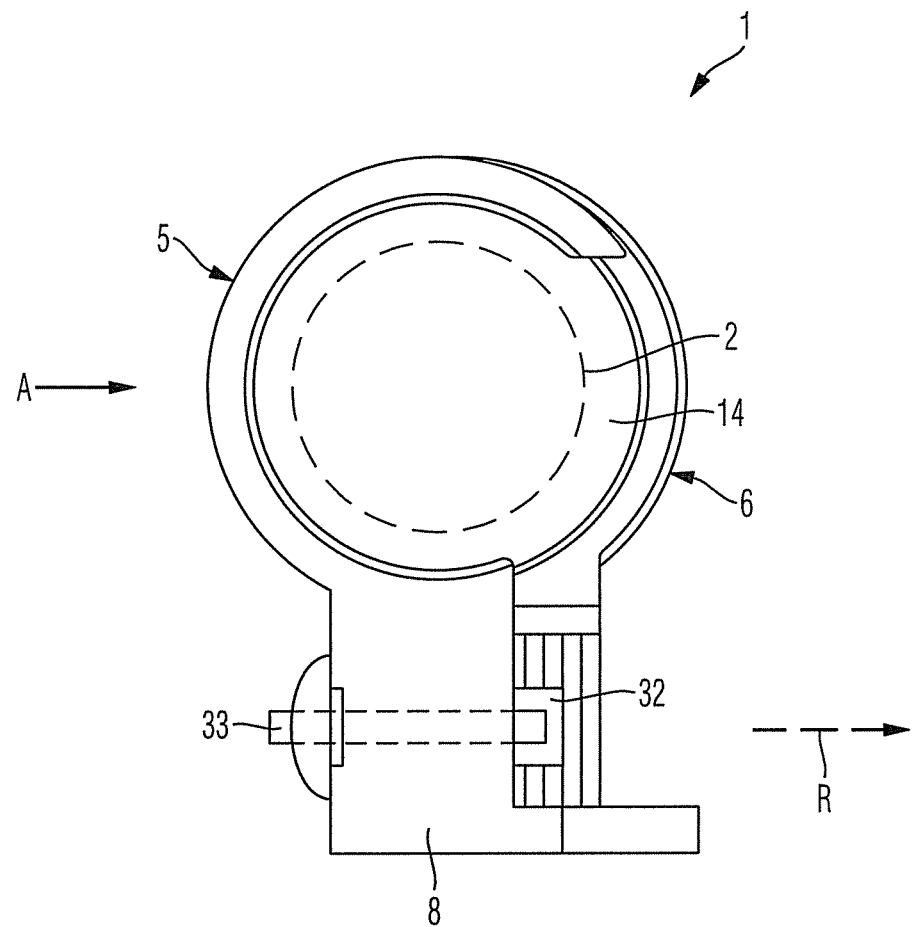
FIG. 2 shows a plan view of the device from FIG. 1 in a first, closed state.
Figure 3:
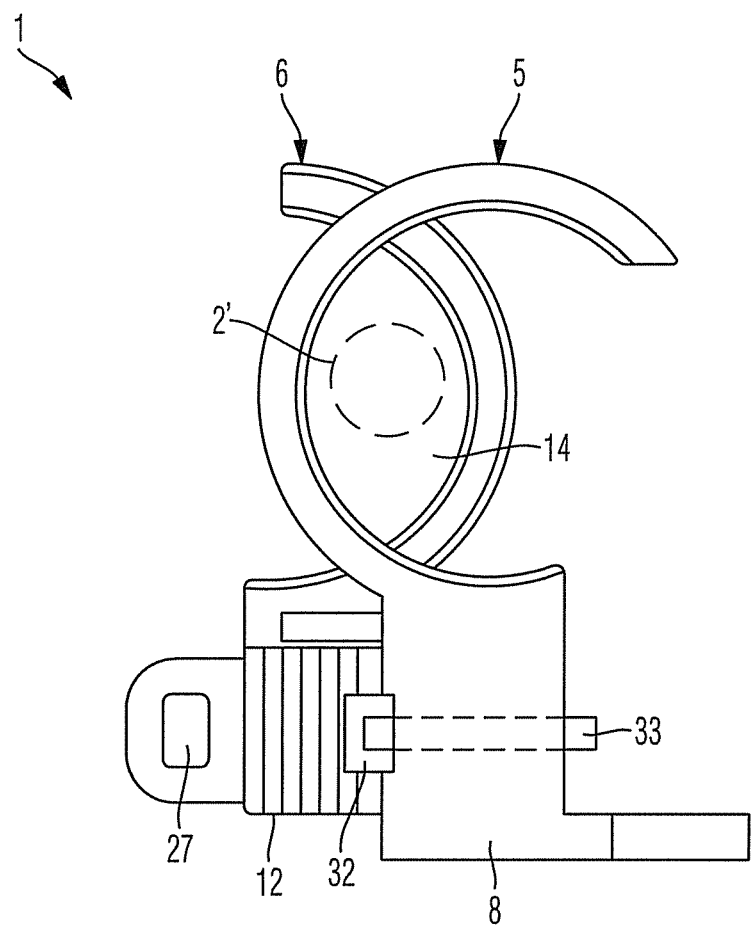
FIG. 3 shows a plan view of the device from FIG. 1 in a second, closed state.
Figure 4:
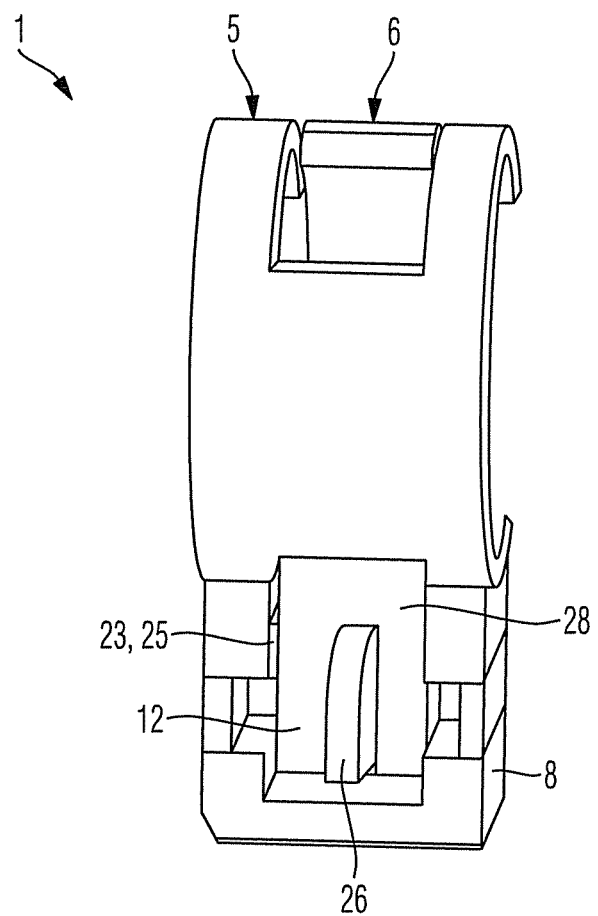
FIG. 4 shows a view A from FIG. 2 slightly perspectively.

FIG. 1 perspectively shows a device 1 for holding systems in an opened state. FIGS. 2 and 3 show the device 1 from FIG. 1 in a first or second closed state in a plan view. FIG. 4 shows a slightly perspective view A from FIG. 2.

The device 1 is suitable for holding systems, in particular electric or fluid-guiding lines, with a different periphery. For example, FIG. 2 shows a system 2 of this type with a large periphery, while FIG. 3 shows a different system 2' with a small periphery.

The device 1 may be a component of an aircraft designated in general by 3. The aircraft 3 may have a rail, a former or another structure 4, on which the device 1 can, in particular, be detachably fastened.

The device has a first holding part 5, see FIG. 1, and a second holding part 6. The holding part 5 comprises a first encompassing portion 7 for encompassing the system 2, 2' in portions and a first foot portion 8. Likewise, the second holding part 6 has a first encompassing portion 11 for encompassing the system 2, 2' in portions and a second foot portion 12.

Furthermore, the device 1 has a fastening mechanism 13, by means of which the first and second foot portion 8, 12 can be detachably fastened to one another, so the first and second encompassing portion 7, 11 of the first and second holding part 5, 6 encompass a region 14, see FIGS. 2 and 3, in which the system 2, 2' is located with its entire periphery. This is the case when the device is in its closed state shown in FIGS. 2 and 3, in other words when the first and second foot portion 8, 12 are fastened to one another.

In the opened state of the device 1, shown in FIG. 1, the second holding part 6 is arranged at a distance from the first holding part 5, so the system 2, 2', with respect to a centre axis M of the first encompassing portion 7, can be guided radially into the latter, whereupon the second holding part 6 is fastened to the first holding part 5 by means of the fastening mechanism 13 and the device 1 can thereby be closed and the system 2, 2' can be securely received in the region 14 then formed.

The first encompassing portion 7 may, for example, be semicircular and to enclose an angle W of greater than 180°, for example between 200 and 300°.

The first encompassing portion 7, at its one end 15, adjoins the first foot portion 8. At its other end 16, the first encompassing portion 7 is formed with a recess 17, in which the second encompassing portion 11 engages in the closed positions shown in FIGS. 2 and 3.

The second encompassing portion 11 of the second holding part 6 is also semicircular, for example, and encloses an angle W of about 180°. The second encompassing portion 11, at its one end 19, adjoins the second foot portion 12 of the second holding part 6.

The first holding part 5 has an opening 18, which completely passes through both the end 15 of the first encompassing portion 7 and the first foot portion 8, see FIG. 4. The opposing insides 22 of the opening 18 (only one of the insides 22 can be seen in FIG. 1) in each case have a tooth system 23 of the fastening mechanism 13. The teeth 24 of the tooth system 23 are arranged one behind the other in the insertion direction designated E in FIG. 1.

The second foot portion 12 of the second holding part 6 has a corresponding tooth system 25. This engages with the tooth system 23 when the second holding part 6 is inserted into the first holding part 5 in the insertion direction E, in other words, the second foot portion 12 together with the end 19 of the second encompassing portion 11 is inserted in the opening 18. The engagement between the tooth system 23 and counter-tooth system 25 can easily be seen in FIG. 4.

The tooth system 23 and the counter-tooth system 25 latch together detachably. Alternatively, instead of the tooth system 23, a corresponding tongue could also be provided, which engages with the counter-tooth system 25. To release the interlocking fit between the tongue and the tooth system 25, the tongue would then have to be bent away by means of a corresponding tool from the tooth system 25, in order to thus release the latter.

The second foot portion 12 of the second holding part 5 has a projection 26 with an opening 27, which extends from a base body 28 of the second foot portion 12 in the insertion direction E. Furthermore, an opening 32, which passes through the counter-tooth system 25, is provided in the base body 28.

In the first, closed state of the device 1 shown in FIG. 2, a cable tie 33, which is only indicated schematically, is inserted through the opening 32 and looped around the first foot portion 8 of the first holding part 5. The cable tie 33 blocks a movement of the second holding part 6 here with respect to the first holding part 5 in the opening direction R. An opening of the device 1 and therefore a release of the system 2, 2' is thus prevented even if the fastening mechanism 13 fails.

In the second, closed state of the device 1 shown in FIG. 3, the first and second holding part 5, 6 are inserted still further into one another and latched to one another in such a way that a smaller region 14 compared to FIG. 2 is formed to receive the system 2' and the opening 32 in the second foot portion 12 is arranged on the side of the first foot portion 8 of the first holding part 5, which is opposing in comparison to FIG. 2. The cable tie 33 is again inserted through the opening 32 here, too, and loops the first foot portion 8 of the first holding part 5 for the purpose of additional securing, as already described above in conjunction with FIG. 2.

In an intermediate position, shown neither in FIG. 2 nor in FIG. 3, the opening 32 is concealed by the first foot portion 8. In this case, the cable tie 33 is inserted through the opening 27 and looped round the first foot portion 8.

The openings 27 and 32 are arranged and dimensioned such that in each position of the first and second holding part 5, 6 with respect to one another, at least one of the openings 27 or 32 is always available to insert one cable tie 33 through it for the purpose of additional securing.

The first foot portion 8 may, for example, have a projection 34, see FIG. 1, together with an opening 35, by means of which the first holding part 5 is fastened by means of a screw, not shown further, to the structure 4.

Although the present invention was described in the present case with the aid of preferred embodiments, it is not limited thereto, but can be modified in many different ways. In particular, the developments and embodiments described in the present case for the device according to the invention can be applied accordingly to the aircraft or spacecraft according to the invention. Furthermore, it should be noted that "a/an" does not in the present case exclude a plurality.

What is claimed is:

1. Device for holding systems, for example an electric or fluid-guiding line, on a structure, in particular an aircraft or spacecraft, comprising:
    a first holding part, which has a first encompassing portion to encompass the system in portions and a first foot portion;
    a second holding part, which has a second encompassing portion for encompassing the system in portions and a second foot portion; and
    a fastening mechanism, by means of which the first and second foot portion of the first and second holding part can be detachably fastened to one another, so that the first and second encompassing portion of the first and second holding part encompass a region, in which the system is located with its entire periphery, wherein the first encompassing portion is approximately semi-circular and encompasses an angle of greater than 180°, and wherein a first end of the first encompassing portion adjoins the first foot portion and a second end of the first encompassing portion is formed with a recess, in which the second encompassing portion engages in a closed position.

2. Device according to claim 1, wherein the first and second foot portion, to change the region encompassed by the first and second encompassing portion, are provided so that they can be fastened to one another at different positions to receive the system.

3. Device according to claim 2, wherein the fastening mechanism has a latching means, which is formed on the first foot portion of the first holding part and has a counter-latching means, which is formed on the second foot portion of the second holding part, the latching means and the counter-latching means being latchable to one another to fasten the first and second foot portion at the different positions.

4. Device according to claim 3, wherein the latching means and/or the counter-latching means has a plurality of teeth, which are arranged one behind the other in the direction (E) along which the first and second foot portion can be moved with respect to one another.

5. Device according to claim 3, wherein the first holding part has at least one opening, in which the second holding part can be inserted to fasten the first and second foot portion to one another.

6. Device according to claim 5, wherein the opening is provided in the first foot portion and in an end of the first encompassing portion adjoining the first foot portion, the opening being provided with the latching means on the inside and the second foot portion being provided with the counter-latching means on the outside.

7. Device according to claim 1, wherein a detachable blocking element is provided, which extends through an opening in the first or second foot portion or in the first and second foot portion and blocks a movement of the first and second foot portion with respect to one another.

8. Device according to claim 1, wherein the first or second encompassing portion is fastened at one end thereof to the first or second foot portion.

9. Device according to claim 1, wherein the first or second foot portion has a fastening means for fastening it to the structure.

10. Aircraft or spacecraft, comprising: a structure, a system; and a device, which is fastened to said structure and which holds said system relative to said structure, said device comprising:
    a first holding part, which comprises a first encompassing portion to encompass the system in portions and a first foot portion;
    a second holding part, which comprises a second encompassing portion for encompassing the system in portions and a second foot portion; and
    a fastening mechanism, by which the first and second foot portion of the first and second holding part can be detachably fastened to one another, so that the first and second encompassing portion of the first and second holding part encompass a region, in which the system is located with its entire periphery, wherein the first encompassing portion is approximately semi-circular and encompasses an angle of greater than 180°, and wherein a first end of the first encompassing portion adjoins the first foot portion and a second end of the first encompassing portion is formed with a recess, in which the second encompassing portion engages in a closed position.

11. Device according to claim 7, wherein the detachable blocking element comprises a cable tie.

12. Device according to claim 8, wherein the first and second encompassing portions are each fastened at one end thereof to the first and second foot portion, respectively.

13. Device according to claim 9, wherein the first and second foot portions each have a fastening means for fastening it to the structure.

14. Device according to claim 1, wherein the second encompassing portion is approximately semi-circular.

* * * * *